United States Patent
Gal et al.

(10) Patent No.: US 12,549,485 B2
(45) Date of Patent: Feb. 10, 2026

(54) ADAPTIVE MULTI-PATH ROUTING

(71) Applicant: MELLANOX TECHNOLOGIES, LTD., Yokneam (IL)

(72) Inventors: Alon Gal, Tel Aviv (IL); Omer Shabtai, Tel-Aviv (IL); Idan Yehosua Barnea, Ramat Gan (IL); Matty Kadosh, Hadera (IL); Jonatan Piasetzky, Tel-Aviv (IL); Ofek Barkai, Petah Tikva (IL); Yaniv Palatchi, Herzliya (IL)

(73) Assignee: Mellanox Technologies, LTD., Yokneam (IL)

( * ) Notice: Subject to any disclaimer, the term of this patent is extended or adjusted under 35 U.S.C. 154(b) by 0 days.

(21) Appl. No.: 18/367,143

(22) Filed: Sep. 12, 2023

(65) Prior Publication Data

US 2025/0088462 A1    Mar. 13, 2025

(51) Int. Cl.
*H04L 47/125* (2022.01)
*H04L 45/24* (2022.01)

(52) U.S. Cl.
CPC ............ *H04L 47/125* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 2008/0240095 A1* | 10/2008 | Basturk | H04L 47/125 370/389 |
| 2015/0372898 A1* | 12/2015 | Haramaty | H04L 49/557 370/225 |
| 2017/0331740 A1* | 11/2017 | Levy | H04L 49/25 |
| 2019/0245915 A1* | 8/2019 | Kommula | H04L 43/0882 |
| 2023/0036715 A1* | 2/2023 | Sinha | H04L 12/1804 |

* cited by examiner

*Primary Examiner* — Fadi Haj Said
(74) *Attorney, Agent, or Firm* — Sheridan Ross P.C.

(57) ABSTRACT

A device, communication system, and method are provided. In one example, a system for routing traffic is described that includes circuits to receive a plurality of packets associated with a destination, determine a plurality of bins based on the destination of the packets, wherein each bin of the plurality of bins is associated with a respective port of the plurality of ports, and, for each packet of the plurality of packets, select a bin of the plurality of bins and forward the packet via the port associated with the selected bin. Described circuits also receive an adaptive routing notification packet via a first port associated with a first bin and in response associate the first bin with a second port and de-associate the first bin with the first port.

20 Claims, 5 Drawing Sheets

ADAPTIVE MULTI-PATH ROUTING

FIELD OF THE DISCLOSURE

The present disclosure is generally directed toward networking and, in particular, toward networking devices, switches, and methods of operating the same.

BACKGROUND

Switches and similar network devices represent a core component of many communication, security, and computing networks. Switches are often used to connect multiple devices, device types, networks, and network types.

Devices including but not limited to personal computers, servers, or other types of computing devices, may be interconnected using network devices such as switches. These interconnected entities form a network that enables data communication and resource sharing among the nodes. Often, multiple potential paths for data flow may exist between any pair of devices. This feature, often referred to as multipath routing, allows data, often encapsulated in packets, to traverse different routes from a source device to a destination device. Such a network design enhances the robustness and flexibility of data communication, as it provides alternatives in case of path failure, congestion, or other adverse conditions. Moreover, it facilitates load balancing across the network, optimizing the overall network performance and efficiency. However, managing multipath routing and ensuring optimal path selection can pose significant challenges, necessitating advanced mechanisms and algorithms for network control and data routing, and power consumption may be unnecessarily high, particularly during periods of low traffic.

BRIEF SUMMARY

In accordance with one or more embodiments described herein, a computing system, such as a switch, may enable a diverse range of systems, such as switches, servers, personal computers, and other computing devices, to communicate across a network. Ports of the computing system may function as communication endpoints, allowing the computing system to manage multiple simultaneous network connections with one or more nodes.

Each port of the computing system may serve as an independent channel for data communication to and from the computing system. Each port of the computing system may be connected to one or more ports of one or more other computing systems. Ports allow for concurrent network communications, enabling the computing system to engage in multiple data exchanges with different network nodes simultaneously. Each port of the computing system may be considered a lane and may be associated with a bin of data, such as data in the form of packets, waiting to be sent via the port. As packets become ready to be sent from the computing system, each packet may be assigned to a particular bin.

Each bin may be associated with an egress port. When a packet is assigned to a particular bin, the packet may be sent from the port associated with the bin. The port associated with each bin may be changed in response to receipt of an adaptive routing notification (ARN) packet, which may be referred to as a remote-congestion notification packet, as well as in response to local reasons such as through the use of a local adaptive routing mechanism which re-routes traffic from congested ports. In effect, the port used to send a particular packet may be dependent upon an assignment of a bin to the packet and an association of the bin to a port. Using a system as described herein, the flow of data through the system may be provided in an efficient manner and provide load balancing of network traffic between multiple paths. The systems and methods described herein enable equal-cost multiple-path (ECMP) data routing for traffic in which out-of-order packet arrival is acceptable, such as for Ethernet remote direct memory access (RDMA) flows and InfiniBand RDMA for examples.

Load balancing of network traffic between multiple paths is conventionally a computationally difficult task. Consider a network switch receiving packets from one or more sources. Each packet flowing through the switch is associated with a particular destination. In simple topologies, there may be a single port of the switch which the packet must be sent from to reach the destination. However, in modern network topologies, such as clusters of graphics processing units (GPUs) used for artificial intelligence (AI) related tasks, there may be many possible ports from which a packet may be transmitted to reach an associated destination. As a result, a decision must be made as to which one of many possible ports should transmit each packet due to the existence of multiple paths in the network.

A goal of a switch in such a scenario in many applications is to route packets toward a destination in such a way as to provide maximal total throughput and avoiding congestion. As an example, consider two packets A and B being received by a switch S1. Packet A is targeted at a destination node X and packet B is targeted to a destination node Y. Switch S1 is connected to two other switches, S2 and S3. Switch S2 is connected to destination nodes X and Y, while switch S3 is connected to destination node X but not destination node Y.

To reach destination node X, packet A can be sent from S1 to S2 or S3. To reach destination node Y, packet B must be sent from S1 to S2. If both packets A and B are sent to their respective destinations from S1 to S2, a congestion may occur at S2 while S3 may be under-utilized. Also, if only one port connects S1 to S2, that port may be over-used while other ports remain unused. In such a scenario, one of the packets A and B may be delayed in reaching its respective destination. If, instead, packet A is sent from S1 to S3 and packet B from S1 to S2, then the packets may arrive at their respective destination without delay and without causing any congestion.

Conventional methods for routing traffic in high-performance computing (HPC) scenarios, such as large-scale or multi-tenant machine learning applications, rely on hash-based routing or other mechanisms which do not attempt to optimize the route of traffic. While such conventional methods may work for non-HPC cases involving small flows, such conventional methods are not optimized for scenarios involving large flows such as many AI applications. Hash-based routing mechanisms result in artificial groupings of unrelated traffic which leads to inefficient and unstable routing. For example, as different flows are received by a conventional switch, the conventional switch assigns all packets in a particular flow to be routed via a particular port. When one flow includes a relatively large number of packets and/or when multiple flows are assigned to the same port, congestion, inefficient routing, and unstable routing can result.

Switches which route packets based on hashes, every packet of a flow is assigned to the same bin and packets of multiple flows can be assigned to the same bin. Moreover, while some bins may be overloaded with packets, other bins may be assigned little or no packets. As a result, bin cans contain relatively excessive numbers of packets and other bins can be under-utilized. Such excessive packets can cause congestion down the line at distant points in the network. For example, a ToR or leaf switch may communicate with a destination via a spine switch. Packets sent from the switch to the spine may be assigned to a bin before being sent via an egress port associated with the bin. An ARN packet sent by the spine switch to the switch in response to one or more of the packets may cause an adaptive routing mechanism to switch the egress port associated with the bin, causing data from the bin to be sent to a different spine switch, but the same problem will keep occurring as all the excessive traffic assigned to the bin will now appear at the different spine. As a result, the egress port for the bin will keep changing and a steady state cannot be achieved. Also, due to the constant changing of bin assignments, ARN packets may be received at ports too late for the bins to be properly reassigned. By the time the ARN packet is received, the bin associated with the port may have already been reassigned.

Every time a port associated with a bin changes, latency can occur. For this reason, a steady state lessens the risk of latency. Furthermore, handling ARN packets and making decisions in response to ARN packets is costly in terms of time and power efficiency. The systems and methods described herein reduce such costs by achieving steady state.

Using a system or method as described herein, a steady state can be achieved. Packets can be assigned to bins in an even manner such that no one bin holds an excessive number of packets. When congestion appears and an ARN packet is received, the bin may be re-associated with a different port and the congestion can be resolved. Such a solution quickly results in a steady state being achieved.

As described herein, a method of routing packets achieves efficient network routing in applications where out-of-order packet arrival is acceptable, such as Ethernet RDMA flows and other HPC scenarios. The systems and methods described herein involve the assignment of packets to bins by a deterministic or non-deterministic selection process which does not rely on routing packets solely based on a flow to which the packet belongs or a hash of the packet. Systems and methods described herein include the assignment of packets to bins randomly. Systems and methods described herein avoid the artificial groupings of unrelated traffic of conventional systems which lead to inefficient and unstable routing.

Systems and methods described herein also include designating or associating transmission (TX) bins with both an outgoing port and a final destination switch. This association of bins with outgoing ports and final destination switches results in fine-grained adaptivity that allows for a steady-state solution not possible with conventional methods.

Systems and methods described herein also include providing a response to the receipt of an ARN by updating local bin information such as by changing an associated outgoing port associated with the bin having received the ARN.

The Systems and methods described herein allow for line rate adaptivity to both local and global routing inefficiencies, providing a technical benefit as compared to conventional solutions which do not handle the AI case well and/or do not work for non-local congestion scenarios.

The present disclosure describes a system and method for enabling a switch or other computing system to route packets in such a way as to solve the above-noted shortcomings and other issues by implementing an improved routing approach. As an illustrative example aspect of the systems and methods disclosed, a method may include receiving a packet associated with a destination; determining a plurality of bins based on the destination of the packet, wherein each bin of the plurality of bins is associated with a respective port of a plurality of ports; selecting a bin of the plurality of bins for forwarding the packet; and forwarding the packet via the port associated with the selected bin.

The above example aspect includes receiving an adaptive routing notification (ARN) packet via a first port of the plurality of ports, wherein the first port of the plurality of ports is associated with a first bin; and in response to receiving the ARN packet, associating the first bin with a second port and de-associating the first bin with the first port.

Any of the above example aspects include wherein the selected bin is selected using a non-deterministic process.

Any of the above example aspects include wherein the non-deterministic process is random or pseudo-random.

Any of the above example aspects include wherein the selected bin is selected using a round-robin selection process.

Any of the above example aspects include the method further comprising receiving a second packet associated with the destination; selecting a second bin of the plurality of bins for forwarding the second packet, wherein the second bin is different from the first bin; and forwarding the second packet via the respective port associated with the second bin.

Any of the above example aspects include wherein each bin of the plurality of bins is further associated with a destination address.

In another illustrative example, a switch comprises one or more circuits to: receive a packet associated with a destination; determine a plurality of bins based on the destination of the packet, wherein each bin of the plurality of bins is associated with a respective port of a plurality of ports; select a bin of the plurality of bins for forwarding the packet; and forward the packet via the port associated with the selected bin.

In yet another illustrative example, wherein the one or more circuits are further to:
receive an adaptive routing notification (ARN) packet via a first port of the plurality of ports, wherein the first port of the plurality of ports is associated with a first bin; and
in response to receiving the ARN packet, associate the first bin with a second port and de-associate the first bin with the first port.

Any of the above example aspects include wherein the selected bin is selected using a non-deterministic process.

Any of the above example aspects include wherein the non-deterministic process is random or pseudo-random.

Any of the above example aspects include wherein the selected bin is selected using a round-robin selection process.

Any of the above example aspects include wherein the one or more circuits are further to: receive a second packet associated with the destination; select a second bin of the plurality of bins for forwarding the second packet; and forward the second packet via the port associated with the second bin.

Any of the above example aspects include wherein each bin of the plurality of bins is further associated with a destination address.

In yet another illustrative example, a network device as described herein comprises: a plurality of ports; and one or more circuits to: receive a plurality of packets associated with a destination; determine a plurality of bins based on the destination of the packets, wherein each bin of the plurality of bins is associated with a respective port of the plurality of ports; and for each packet of the plurality of packets: select a bin of the plurality of bins; and forward the packet via the port associated with the selected bin.

The above example aspect includes wherein the one or more circuits are further to: receive an adaptive routing notification (ARN) packet via a first port of the plurality of ports, wherein the first port of the plurality of ports is associated with a first bin; and in response to receiving the ARN packet, associate the first bin with a second port and de-associate the first bin with the first port.

Any of the above example aspects include wherein the selected bin is selected using a non-deterministic process.

Any of the above example aspects include wherein each bin of the plurality of bins is further associated with a destination address.

Any of the above example aspects include wherein the selected bin is selected using a round-robin selection process.

Any of the above example aspects include wherein each bin of the plurality of bins is further associated with a destination address.

The routing approaches depicted and described herein may be applied to a switch, a router, or any other suitable type of networking device known or yet to be developed. Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
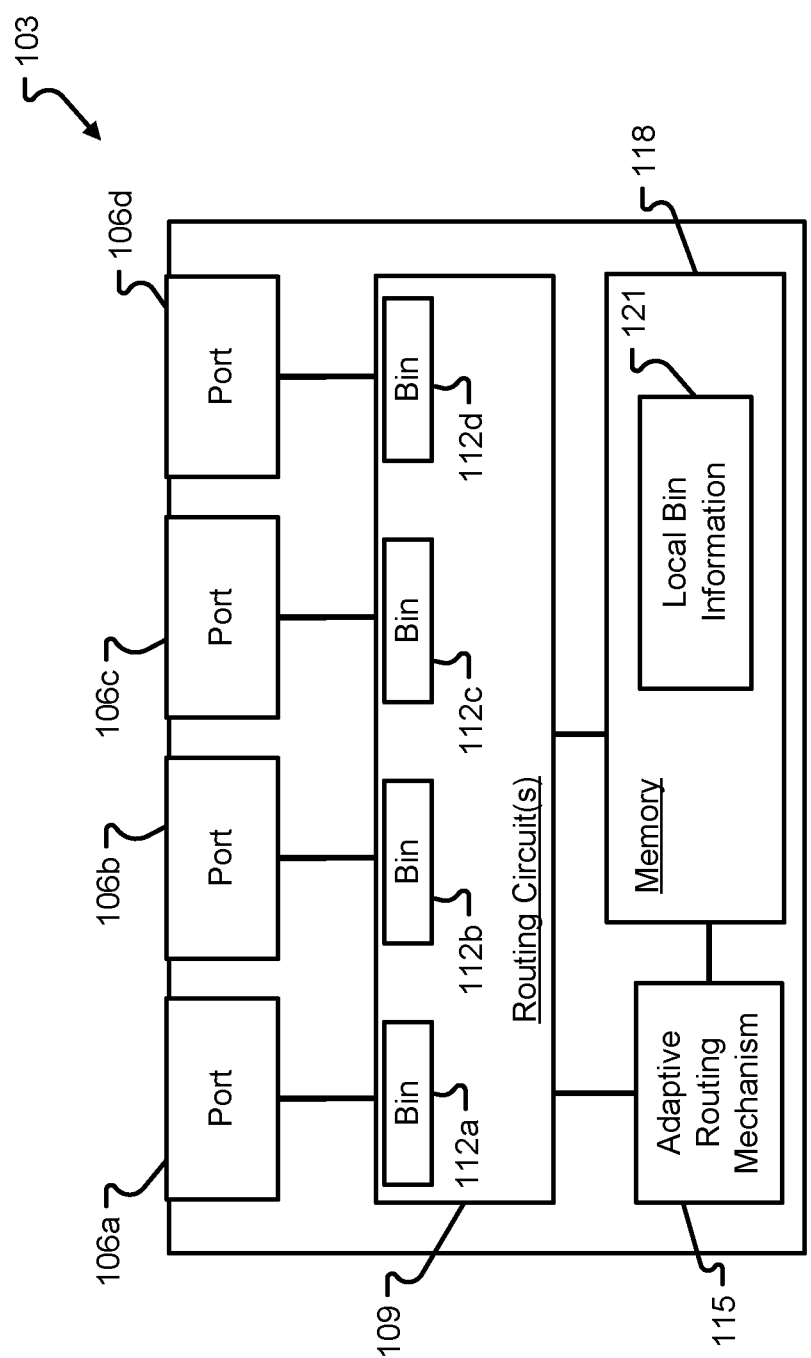
FIG. 1 is a block diagram depicting an illustrative configuration of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-7, various systems, and methods for routing packets between communication nodes will be described. The concepts of packet routing depicted and described herein can be applied to the routing of information from one computing device to another. The term packet as used herein should be construed to mean any suitable discrete amount of digitized information. The data being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

In accordance with one or more embodiments described herein, a computing system 103 as illustrated in FIG. 1 may enable a diverse range of systems, such as switches, servers, personal computers, and other computing devices, to communicate across a network. Such a computing system 103 as described herein may for example be a switch or any computing device comprising a plurality of ports 106a-d for connecting with nodes on a network.

Figure 2:
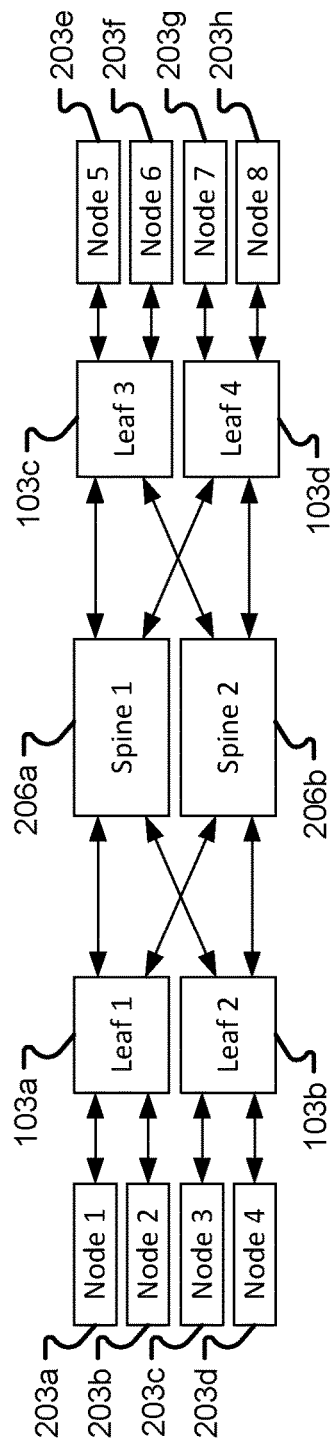
FIG. 2 illustrates a network of a computing system and nodes in accordance with at least some embodiments of the present disclosure.

In some implementations, a switch, as described herein, may function as a leaf within a larger, hierarchical network topology such as illustrated in FIG. 2 and described below. Such a network configuration, which may be referred to as a leaf-spine architecture, may encompass multiple leaf switches directly interfacing with endpoint devices or nodes, while simultaneously communicating with one or more centralized switches or spines. The network topology may be installed in such a way that data packets transmitted between any two leaf switches need to traverse through only a single spine switch.

Such a leaf switch may also be characterized as a top-of-rack (ToR) switch. A ToR switch may be positioned at the top of a rack in a data center or server room. Such ToR switches may facilitate the interconnection of servers within the same rack. By operating as a ToR, a leaf switch can reduce cabling complexity and improve scalability by serving as a localized aggregation point for servers to which it directly connects.

The ports 106a-d of the computing system 103 may function as communication endpoints, allowing the computing system 103 to manage multiple simultaneous network connections with one or more nodes. Each port 106a-d may be used to transmit data associated with one or more flows. In some implementations, a single flow of data may be transmitted using a plurality of ports 106a-d.

Each bin 121a-d may be associated with or mapped to a port 106a-d. The port 106a-d associated with a bin 121a-d may be enabled to handle incoming and outgoing data packets associated with flows. It should be appreciated that in some implementations, multiple bins 121a-d may be mapped to the same port or may be mapped to separate ports. Bins 112a-d as described herein may be data structures acting as intermediary holding circuits for assigned packets. For example, upon the arrival or reception of a packet at the computing system 103, a classification or assignment mechanism may be triggered, such as described below in relation to the method 600 of FIG. 6. The assignment mechanism may determine an appropriate bin 112a-d to which the packet should be assigned.

Once a packet has been assigned to a bin 112a-d, the computing system 103 may initiate a process of forwarding or transmitting the packet. The transmission of the packet may take place via a port that is specifically associated or linked with the assigned bin 112a-d. The association between bins and ports may be based on local bin information 121 stored in memory 118. The association of bins and ports may be changed such as by an adaptive routing mechanism 115 in response to ARNs received via ports 106a-d, such as described below in relation to the method 700 of FIG. 7. A bin 112 as described herein may be a logical space in memory such as a cache or queue which may contain packets assigned to the respective bin 112 until routed via a port associated with the bin 112.

The ports 106a-d of the computing system 103 may be physical connection points which allow network cables such as Ethernet cables to connect the computing system 103 to one or more network nodes and/or spines, such as illustrated in FIG. 2. Each port 106a-d may be of a different type, including, for example, a 100 Mbps, 1000 Mbps, or 10-Gigabit Ethernet ports, each providing different levels of bandwidth.

Packets received, created, or otherwise handled by the computing system 103 to be transmitted from the computing system 103 may be associated with a particular destination. For example, in some implementations a leaf switch may handle packets carrying specific forwarding information. Each packet traversing through the leaf switch can include details regarding a final destination which may be specified in terms of an IP address or another identifier. Final destination information may be used to ensure data reaches its intended endpoint, even if it must navigate through multiple intermediate devices or networks. In some implementations, a packet may also contain details about an immediate or next hop switch to which the packet should be forwarded through the network.

Because each port 106a-d may be used to send a particular packet, when a packet is received, created, or otherwise handled by the computing system 103 and is to be transmitted from the computing system 103, one or more ports 106a-d of the computing system 103 may be selected to transmit the packet such as through a method 600 as described below. Transmitting a packet from a port 106a-d may comprise, as described in greater detail below, assigning the packet to a bin 112a-d associated with the port 106a-d.

One or more routing circuits 109 of the computing system may comprise an internal fabric or pathway within the computing system 103 through which data travels between two ports 106a-d. The routing circuits 109 may in some embodiments comprise one or more network interface cards (NICs). For example, in some embodiments, each port 106a-d may be associated with a different NIC. The NIC or NICs may comprise hardware and/or circuitry which may be used to transfer data between ports 106a-d.

Routing circuits 109 may also or alternatively comprise one or more application-specific integrated circuits (ASICs) to perform tasks such as determining to which port a received packet should be sent. The routing circuits 109 may comprise various components including, for example, port controllers that manage the operation of individual ports, network interface cards that facilitate data transmission, and internal data paths that direct the flow of data within the computing system 103. The routing circuits 109 may also include memory elements to temporarily store data and management software to control the operation of the hardware. This configuration could enable the routing circuits 109 to accurately track port usage and provide data to the processor and/or adaptive routing mechanism 115 upon request.

As illustrated in FIG. 1, the computing system 103 may also comprise an adaptive routing mechanism 115, such as a circuit or device capable of reading instructions from memory 118 and performing actions. The adaptive routing mechanism 115 may in some implementations be a process executed by a CPU, a microprocessor, or any circuit or device. The adaptive routing mechanism 115 may execute software instructions to control operations of the computing system 103, such as by receiving and processing ARNs received via ports 106a-d and updating local bin information 121 in memory 118 in response such as through a method 700 as described below.

In some implementations, a processor may function as a central processing unit of the computing system 103 and execute the system's operative capabilities. A processor may communicate with components of the computing system 103 to manage and perform computational operations, ensuring optimal system functionality and performance.

In further detail, a processor may be engineered to perform a wide range of computational tasks. Capabilities of the processor may encompass executing program instructions, managing data within the system, and controlling the operation of other hardware components such as routing circuits 109. The processor may be a single-core or multi-core processor and might include one or more processing units, depending on the specific design and requirements of the computing system 103. The architectural design of the processor may allow for efficient instruction execution, data processing, and overall system management, thereby enhancing the performance and utility of the computing system 103 in various applications. Furthermore, the processor may be programmed or adapted to execute specific tasks and operations according to application requirements, thus potentially enhancing the versatility and adaptability of the computing system 103.

The computing system 103 may further comprise one or more memory 118 components. Memory 118 may be configured to communicate with the adaptive routing mechanism 115 and/or the routing circuits 109 of the computing system 103. Communication between memory 118, the adaptive routing mechanism 115, and the routing circuits 109 may enable various operations, including but not limited to, data exchange, command execution, and memory management.

The memory 118 may be constituted by a variety of physical components, depending on the specific type and design. At the core, memory 118 may include one or more memory cells capable of storing data in the form of binary information. These memory cells may be made up of transistors, capacitors, or other suitable electronic components depending on the memory type, such as DRAM, SRAM, or Flash memory. To enable data transfer and communication with other parts of the computing system 103, memory 118 may also include data lines or buses, address lines, and control lines. Such physical components may collectively constitute the memory 118, contributing to its capacity to store and manage data.

Data stored in memory 118 may encompass information about various aspects of port, bin, and system usage. Such information might include data about associations of bins 112a-d with ports 106a-d, and associations of ports 106a-d and/or bins 112a-d with destination addresses, among other things as described in greater detail herein. The data in the memory 118, such as local bin information 121, may be stored, accessed, and utilized by the adaptive routing mechanism 115 and/or the routing circuits in managing port operations and network communications. For example, the adaptive routing mechanism 115 might utilize the local bin information 121 in memory 118 to respond to the receipt of ARNs or otherwise control the flow of data through the computing system 103 as described in greater detail herein.

In one or more embodiments of the present disclosure, a computing system 103, such as a switch, may be in communication with a plurality of network nodes 203a-f as illustrated in FIG. 2. In the network illustrated in FIG. 2, each computing system 103 serves as a leaf facilitating communication between nodes 203a-h via spines 206a-b and other leaf switch computing systems 103a-d. Each network node 203a-h may be a computing system with capabilities for sending and receiving data. Each node 203a-h may be any one of a broad range of devices, including but not limited to switches, personal computers, servers, or any other device capable of transmitting and receiving data in the form of packets. Via the spines 206a-b, each leaf switch 103a-d may be capable of communicating with distant systems such as other leaf switch computing systems 103a-d.

In some implementations, packets sent from a node 200a may originate at an application. For example, a node 203a may be a computing system executing one or more applications which communicate with a destination device acting as another node 203h via one or more leaf switch computing systems 103a-d and spines 206a-b.

Spines 206a-b as described herein may be computing systems 103 such as illustrated in FIG. 1 and described above or may be other types of computing systems capable of receiving and transmitting packets. Spines 206a-b may in some implementations be capable of detecting traffic or congestion and generating ARNs in response. ARNs may be sent by spines 206a-b to a port of a leaf switch computing system 103a-d in the event that the respective port sends data via the spine 206a-b in such a way that contributes to excessive traffic or congestion. Such an event may be as described in greater detail in relation to FIGS. 4A-C and 5A-C.

It should be appreciated that in some implementations, packets sent from computing systems 103a-d may originate within the computing systems 103a-d. For example, the computing system 103 may execute one or more applications which communicate with a node 203a-h and/or another computing system 103a-d, such as via one or more spines 206a-b.

While the network illustrated in FIG. 2 shows a particular number of nodes 203a-h, leaf switch computing systems 103a-d, and spines 206a-b, it should be appreciated that in some implementations other numbers of each of the devices may be used and it may be possible to perform the systems and methods described herein without involving certain devices, such as nodes 203a-h. Additionally, the illustrated interconnection of nodes 203a-h, leaf switch computing systems 103a-d, and spines 206a-b should be considered as being for illustration purposes only. In some implementations a single node 203 may connect to a plurality of leaf switch computing systems 103 and/or directly to a spine 206. Furthermore, in some implementations, some leaf switch computing systems 103a-d may connect to only some of the spines 206a-b. It should be appreciated that leaf switch computing systems 103a-d, spines 206a-b, and nodes 203a-h may be laid out in any number of various interconnected topologies.

For example, nodes 203a-h may be connected to a plurality of computing systems 103 and spines 206 as described herein forming a network of interconnected switches. Multiple computing systems 103, such as switches, can be interconnected in a variety of topologies, such as star, ring, or mesh, depending upon the specific requirements and resilience needed for the network. For instance, in a star topology, a plurality of switches may be connected to a central switch, whereas in a ring topology, each switch may be connected to two other switches in a closed loop. In a mesh topology, each switch may be interconnected with every other switch in the network.

Computing systems 103a-d may establish communication channels with the network nodes 203a-h via ports. Such channels may support data transfer in the form of flows of packets, following predetermined protocols that govern the format, size, transmission method, and other aspects of the packets. Each network node 203a-h may interact with computing systems 103a-d in various ways. A node 203 may send data packets to a computing system 103a-d for processing, transmission, or other operations, or for forwarding to another node 200. Conversely, each node 200 may receive data from the computing system 103, originating from either the computing system 103 itself or other network nodes 200a-f via the computing system 103. In this way, the computing system 103 and nodes 200a-f could collectively form a network, facilitating data exchange, resource sharing, and a host of other collaborative operations.

In the example illustrated in FIG. 2, each of the nodes 203a are connected to one or more ports of one of leaf switch computing systems 103a-d. Each of the leaf switch computing systems 103a-d are connected to one or more ports of each spine 206a-b. As a result, each node 203a-h can communicate with any other node 203a-h via one or more leaf switch computing systems 103a-d and/or spines 206a-b. For example, the computing system 103 may use any of ports 106b-f to send a packet from a node 200a to another node 200b.

Figure 3:
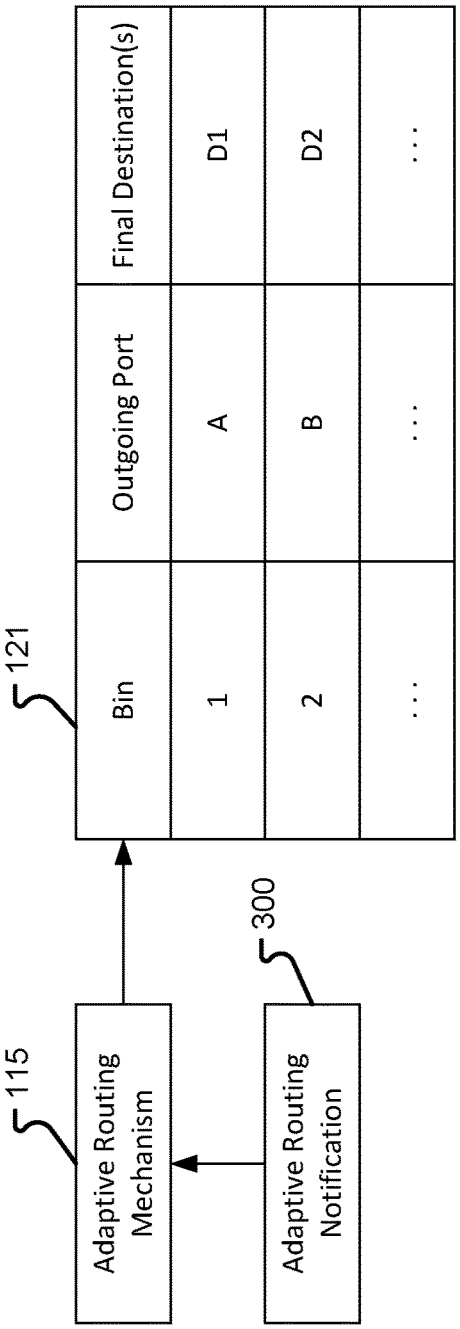
FIG. 3 illustrates local bin information and an adaptive routing mechanism in accordance with at least some embodiments of the present disclosure.

FIG. 3 illustrates local bin information 121 and an adaptive routing mechanism 115. Local bin information 121 may serve as a structured repository where bins are associated with specific outgoing ports and final destinations, such as nodes 203a-h, which are served by the respective bin. The outgoing port associated with a bin may be the port from which packets assigned to the bin are transmitted from the system. Each bin, in this context, acts as a categorization or bucketing mechanism for packets. The inclusion of the final destination(s) in the local bin information 121 may be used to ensure packets assigned to a respective bin are forwarded in a manner that directs the packets towards their destination.

Local bin information 121 may also include information indicating an adaptive routing group associated with each bin. Each bin may be associated with adaptive routing groups. Each adaptive routing group may be associated with a plurality of bins. As described herein, when a packet is received, an adaptive routing group associated with the packet may be determined and based on the determined adaptive routing group, a group or plurality of bins to which the packet may be assigned may be determined. In some implementations, each adaptive routing bin may be associated with a different destination switch, such as a destination ToR switch. Using such a system, packets of flows associated with one destination ToR switch may not share bins with packets of flows associated with a different ToR switch. In this way, bins may be pre-divided according to destinations.

In some implementations, local bin information 121 may be stored in the form of a table such as within memory 118 of a computing system 103a. In other implementations, the local bin information 121 may be realized through specialized circuitry. For example, local bin information 121 may be in the form of a hardware-centric approach which may leverage a combination of switches, registers, multiplexers, and/or other electronic devices to codify associations between bins, ports, and destinations. In a hardware-centric approach, local bin information 121 may comprise a set of electronic devices through which data may flow along a predefined path created by the interconnectedness of these components, thereby facilitating the bin-to-port associations.

An adaptive routing mechanism 115 may be a software process or hardware device capable of receiving and processing ARNs 300 and updating local bin information 121 in response. For example, an ARN 300 may be received from a device such as a spine 206 via a port of a computing system 103. The ARN 300 may represent that data sent from the port is contributing to or affected by congestion between other devices, such as the spine 206 from which the ARN 300 is received and another computing system 103 such as a leaf switch and/or a node 203.

The port from which the ARN 300 is received may be associated with a bin as described in the local bin information 121. In response to receiving the ARN 300, the adaptive routing mechanism, through a method such as described below in relation to FIG. 7, may update the local bin information 121 by de-associating the port from which the ARN 300 is received with the bin associated with the port and re-associating the bin with a different outgoing port and/or re-associating the port from which the ARN 300 is received with a different bin.

Exemplary scenarios in which ARNs may be received by a computing system 103a and used to update local bin information are illustrated in FIGS. 4A-4C and 5A-5C. In each of the exemplary scenarios, a source computing system 103a, such as a leaf switch, sends data to one or more destinations via one or more spines 206a-b. The destinations may be other computing systems 103b-c such as leaf switches or may be nodes.

Figure 4A:
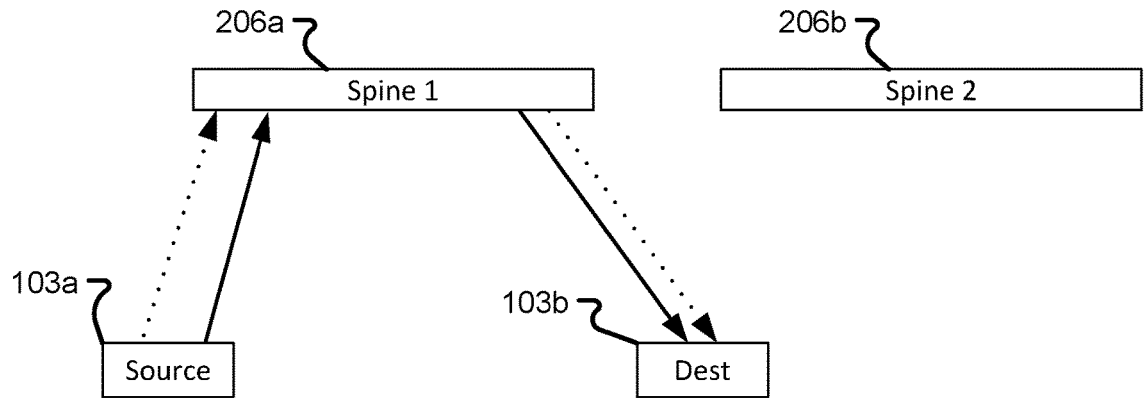
FIGS. 4A, 4B, and 4C illustrate an exemplary scenario in accordance with at least some embodiments of the present disclosure.

In the exemplary scenario illustrated in FIG. 4A, a source computing system 103a, which may be a leaf or ToR switch for example, transmits data, represented by the dotted arrow and the solid arrow, to a first spine 206a. The destination of the data is a destination computing system 103b. The first spine 206a receives the data and forwards the data via one or more ports to the destination computing system 103b.

The data sent from the source computing system 103a to the destination computing system 103b, represented by the dotted and solid arrows, may be a single flow or different flows. The data may originate at the source computing system 103a or at another device such as a node 203 which sends the data using the source computing system 103a.

The dotted arrow traffic has been assigned to a first bin and is being sent from a first port to the first spine 206a. The solid arrow traffic has been assigned to a second bin and is being sent from a second port to the first spine 206a. A second spine 206b which is connected to the source computing system 103a and the destination computing system 103b via one or more ports is not currently involved in sending the data represented by the dotted and solid arrows to the destination computing system 103b.

Upon receipt of the data from the source computing system 103a, the first spine 206a may take on the responsibility of forwarding the data to the destination computing system 103b. For example, once the first spine 206a identifies the appropriate destination for the data—be it a leaf switch or a terminal node within the network—the first spine 206a initiates the process of forwarding the data via one or more ports.

Figure 4B:
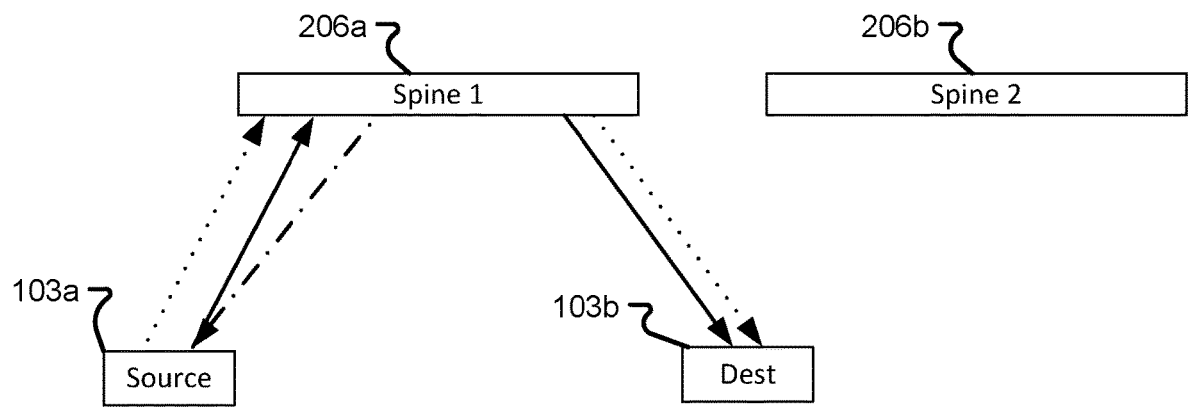

As illustrated in FIG. 4B, the first spine 206a sends an ARN packet, represented by the dash-dot arrow, in response to the data represented by the solid arrow sent from the source computing system 103a. The ARN packet may be sent by the first spine 206a in response to a determination that an excessive amount of traffic, such as traffic exceeding a threshold, is being output by the first spine 206a toward the destination computing system 103b. Because of the congestion issue between the first spine and the destination computing system 103b, the ARN packet sent by the first spine 206a to the source computing system 103a arrives at the same port which is sending the data represented by the solid arrow.

In response to the ARN packet, an adaptive routing mechanism may update local bin information to disassociate the bin with the port from which the ARN packet was received and to associate the bin with a different port. Moving forward, packets assigned to the bin may be sent from the source computing system 103a via the different port.

Figure 4C:
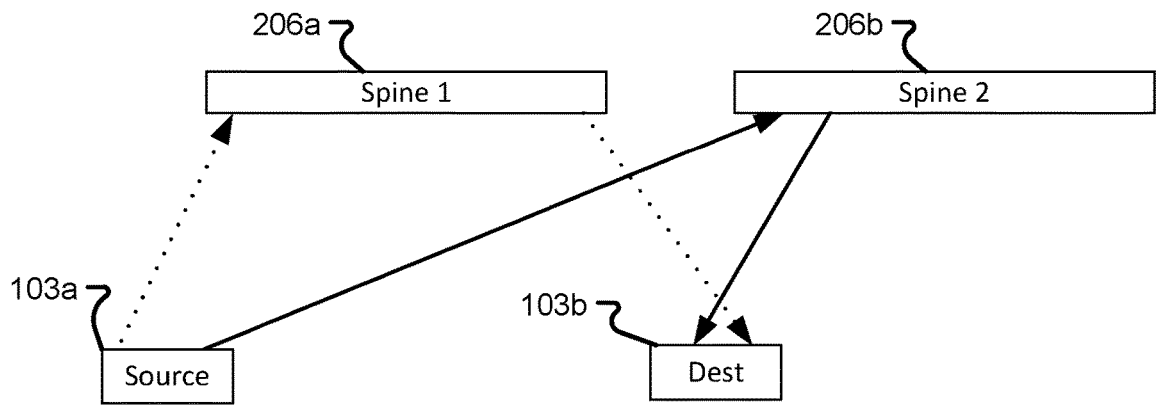

As illustrated in FIG. 4C, the data represented by the solid line is now routed from a different port of the source computing system 103a to be routed to the destination computing system 103b via the second spine 206b, reducing the amount of traffic between the first spine 206a and the destination computing system 103b. As should be appreciated, the traffic represented by the dotted arrow continues unaffected by the ARN packet, even if the dotted arrow traffic is of the same flow as the solid arrow traffic. The process of receiving an ARN packet and updating local bin information may be performed using a method 700 as described below in relation to FIG. 7.

Figure 5A:
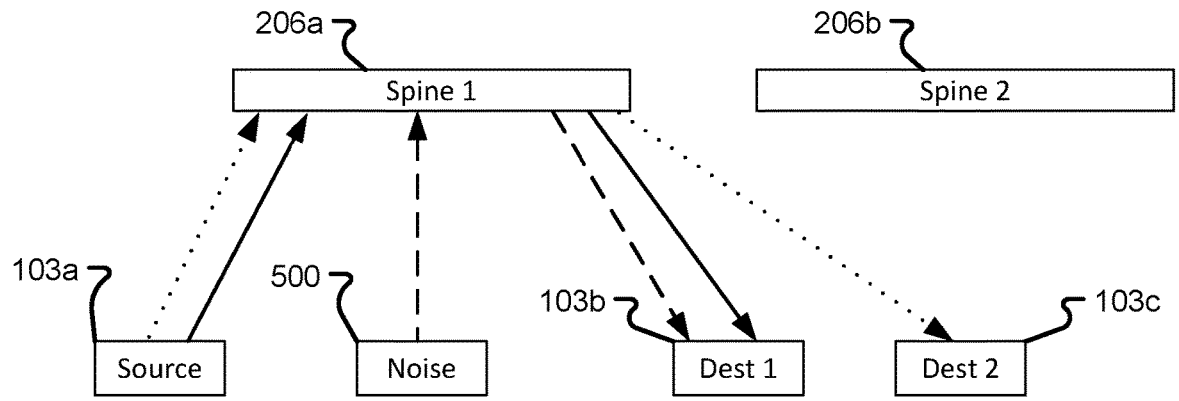
FIGS. 5A, 5B, and 5C illustrate an exemplary scenario in accordance with at least some embodiments of the present disclosure.

As illustrated in FIG. 5A, a source computing system 103a, which may be a leaf or TOR switch for example, transmits first data, represented by the solid arrow, and second data, represented by the dotted arrow, to a first spine 206a. The destination of the first data is a first destination computing system 103b. The destination of the second data is a second destination computing system 103c. The first spine 206a receives the data and forwards the first data via one or more ports to the first destination computing system 103b and forwards the second data via one or more ports to the second destination computing system 103c. Another device 500, labeled noise, sends data, represented by the dashed line, to the first destination computing system 103b.

The first and second data sent from the source computing system 103a to the first and second destination computing systems 103b-c, represented by the dotted and solid arrows, may be a single flow or different flows. For example, each of the first and second destination computing systems 103b-c may forward the first and second data, respectively, toward a same final destination. The first and second data may originate at the source computing system 103a or at another device such as a node 203 which sends the data using the source computing system 103a.

The dotted arrow traffic has been assigned to a first bin and is being sent from a first port to the first spine 206a. The solid arrow traffic has been assigned to a second bin and is being sent from a second port to the first spine 206a. A second spine 206b which is connected to the source computing system 103a and the destination computing systems 103b-c via one or more ports is not currently involved in sending the data represented by the dotted and solid arrows to the destination computing systems 103b-c.

Upon receipt of the data from the source computing system 103a, the first spine 206a may take on the responsibility of forwarding the data to the appropriate destination computing systems 103b-c. For example, once the first spine 206a identifies the appropriate destination for the data—be it a leaf switch or a terminal node within the network—the first spine 206a initiates the process of forwarding the data via one or more ports.

Figure 5B:
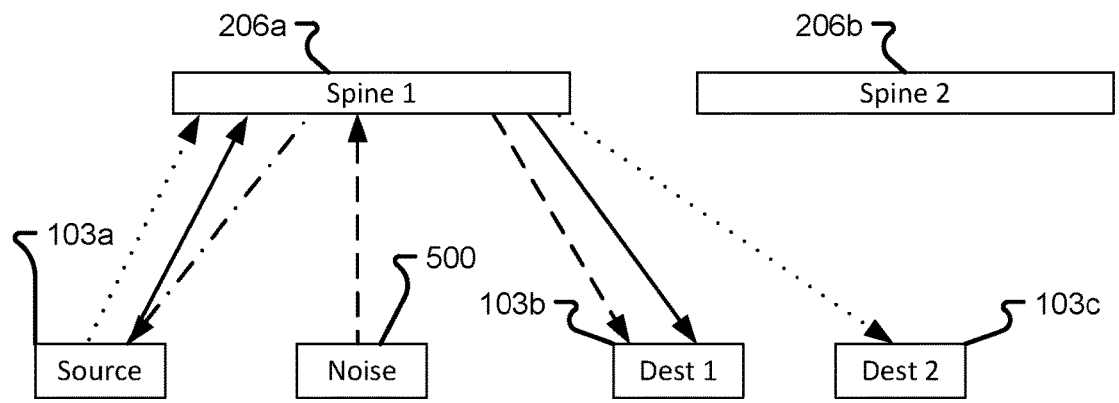

As illustrated in FIG. 5B, the first spine 206a sends an ARN packet, represented by the dash-dot arrow, in response to the data represented by the solid arrow sent from the source computing system 103a.

The ARN packet may be sent by the first spine 206a in response to a determination that an excessive amount of traffic, such as traffic exceeding a threshold, is being output by the first spine 206a toward the first destination computing system 103b. For example, excessive traffic may be due at least in part to data sent by the noise device 500 to the first destination computing system 103b via the first spine 206a. Because of the congestion issue between the first spine and the first destination computing system 103b, the ARN packet sent by the first spine 206a to the source computing system 103a arrives at the same port which is sending the data represented by the solid arrow.

In response to the ARN packet, an adaptive routing mechanism of the source computing system 103a may update local bin information to disassociate the bin with the port from which the ARN packet was received and to associate the bin with a different port. Moving forward, packets assigned to the bin may be sent from the source computing system 103a via the different port.

Figure 5C:
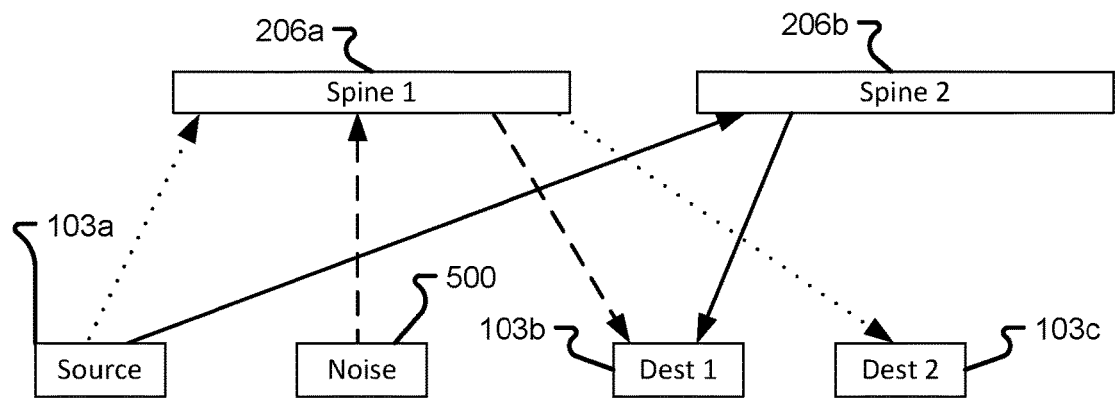

As illustrated in FIG. 5C, the data represented by the solid line is now routed from a different port of the source computing system 103a to be routed to the first destination computing system 103b via the second spine 206b, reducing the amount of traffic between the first spine 206a and the first destination computing system 103b. As should be appreciated, the traffic represented by the dotted arrow continues unaffected by the ARN packet, even if the dotted arrow traffic is of the same flow as the solid arrow traffic. The process of receiving an ARN packet and updating local bin information may be performed using a method 700 as described below in relation to FIG. 7.

Figure 6:
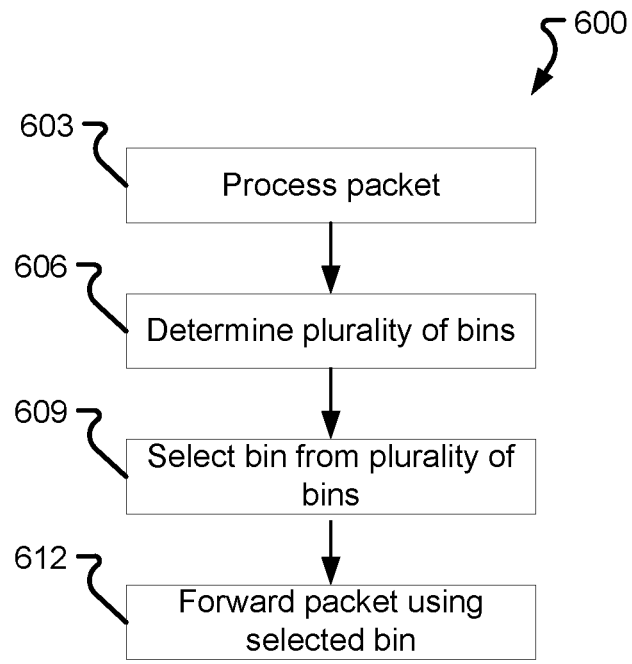
FIG. 6 is a flow diagram depicting a method in accordance with at least some embodiments of the present disclosure.
Figure 7:
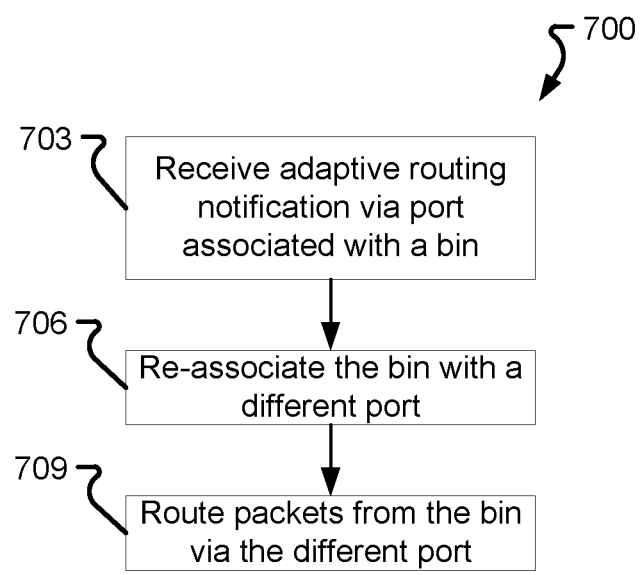
FIG. 7 is a flow diagram depicting a method in accordance with at least some embodiments of the present disclosure.

As illustrated in FIG. 6, and in accordance with a computing system 103 as illustrated in FIG. 1 and as described above, a method 600 may be performed to forward packets towards destination devices using particular bins. As illustrated in FIG. 7, and in accordance with a computing system 103 as illustrated in FIG. 1, and as described herein, a method 700 may be performed to update local bin information 121 such as through the use of an adaptive routing mechanism as described above. Adaptive routing mechanisms as described herein may include a software process or a hardware circuit or some combination thereof and may be capable of altering local bin information such as illustrated in FIG. 3. While the description of the methods 600 and 700 provided herein describes steps of the methods 600 and 700 as being performed by particular components of the computing system 103, the steps of the methods 600 and 700 may be performed by one or more processors, routing circuits 109, controllers, circuits in the computing system 103, or some combination thereof. As should be appreciated, the methods 600 and 700 may be implemented through hardware or software. As a result of the methods 600 and 700, an adaptive routing of packets may be achieved which may result in efficient traffic routing for applications in which packets can arrive at destination in a different order from the order sent such as RDMA routing.

At 603, a computing system 103, such as a leaf or ToR switch, may process a packet. Processing a packet as described herein may include receiving the packet or generating the packet. In some implementations, a computing system 103 within a network may receive packets via one or more ports while in some implementations the computing system 103 may execute one or more applications which may generate packets which may be sent from the computing system 103.

Upon receiving, or generating, a packet, the computing system 103 may perform a processing of the packet to determine a destination associated with the packet. For example, one or more routing circuits 109 or other components of the computing system 103 may perform header examination or otherwise determine a destination of the packet. In some implementations, the computing system 103 may refer to one or more internal tables or databases mapping packet attributes to potential destinations. Based on the final destination of the packet, the computing system 103 may determine where the packet should be routed next.

In some implementations, a packet as described herein may be one packet of a flow of data. A flow of data may be a continuous stream or sequence of packets from a singular source to a specific destination.

At 606, the computing system 103 may determine a plurality of bins from which the packet may be sent to reach the destination. Because, as illustrated in FIG. 2, a computing system 103 may be interconnected to nodes 203 via a number of switches and spines, the computing system 103 may send the packet towards the destination via a number of different ports 106. Before selecting a particular bin for forwarding the packet, the computing system 103 may identify a group of bins in which the packet may be assigned to any bin of the group of bins and be enabled to reach its destination.

Each bin of the plurality of bins may be associated with a respective port of a plurality of ports. For example, local bin information 121 may be used to associated each bin with a respective port. A packet assigned to a bin may eventually be sent via the port associated with the assigned bin. As described above, each bin of the plurality of bins may also be associated with a destination address. For example, local bin information 121 may include information such as destination nodes serviced by each particular bin.

As described above, local bin information 121 may include information indicating an adaptive routing group associated with each bin. Each bin may be associated with adaptive routing groups. Each adaptive routing group may be associated with a plurality of bins. As described herein, when a packet is received, an adaptive routing group associated with the packet may be determined and based on the determined adaptive routing group, a group or plurality of bins to which the packet may be assigned may be determined. In some implementations, each adaptive routing bin may be associated with a different destination switch, such as a destination ToR switch. Determining a plurality of bins from which a packet may be sent to reach a destination may involve determining an adaptive routing group associated with the packet and selecting a group of bins associated with the determined adaptive routing group.

At 609, a bin may be selected from the plurality of bins for forwarding the packet. The selection of the bin for forwarding the packet may be made using a deterministic or a non-deterministic process. The method of selecting a bin to assign the packet can vary based on the requirements of the network or the application. For instance, in some implementations, the computing system 103 may leverage a randomization mechanism. For example, using either built-in algorithms or external random number generators, the system can determine a random bin of the determined plurality of bins to which the packet should be assigned. This randomness can serve to distribute the load evenly across all bins of the determined plurality of bins.

The randomization can in some implementations be achieved using a variety of algorithms or methods. For instance, pseudorandom number generators might be employed to decide the bin assignment for each packet. Such generators, though deterministic in nature, produce number sequences that approximate true randomness, ensuring that over time, each bin of the determined plurality of bins receives a roughly equivalent number of packets. In other cases, true random number generators, which might rely on inherently random physical processes, can be utilized.

Furthermore, the granularity of randomization can be adjusted based on system needs. For example, in scenarios where rapid fluctuations in bin assignment might be undesirable, the system can introduce a temporal component, ensuring that random reassignments only occur after certain intervals or after a set number of packets have been processed. Conversely, in highly dynamic environments where swift adaptability is required, a higher frequency of randomization might be more appropriate.

Alternatively, in some implementations, the computing system 103 may employ a selection process such as a round-robin mechanism or other deterministic process. For example, in a round-robin approach, packets may be allocated to bins of the determined plurality of bins in a cyclical manner. For example, if there are three bins, the first packet might be assigned to bin one, the second packet to bin two, the third packet to bin three, the fourth packet back to bin one, and so on. In some implementations, a deterministic mapping based on a field that increases by one for each packet in a flow may be used to achieve round-robin bin selection.

Regardless of the technique used, whether deterministic or non-deterministic, the computing system 103 may assign outgoing packets to bins of the determined plurality of bins without regard to the flow to which the packets are associated or to any hash information. By doing so, the system can optimize packet handling operations, ensure balanced utilization of resources, and possibly improve overall network performance, particularly for applications in which the order of packets is not critical, such as RDMA.

At 612, after selecting a bin of the determined plurality of bins, the packet may be assigned to the selected bin and forwarded via the port associated with the selected bin. In some implementations, after a port is assigned to a bin, one or more routing circuits 109 may perform a lookup to determine, based on the local bin information 121, from which port 106*a-d* the packet should be sent.

The method 600 may repeat with receiving a second packet associated with the destination, selecting a second bin of the plurality of bins for forwarding the second packet, wherein the second bin is different from the first bin, and forwarding the second packet via the respective port associated with the second bin.

As illustrated in FIG. 7, a method 700 of adjusting or updating local bin information in a computing system 103 may be performed in response to receipt of an ARN packet. The method 700 may begin when, during the course of sending data from one or more ports of the computing system 103, the computing system receives, at 703, an ARN packet via a port of the one or more ports. As described above, each port may be associated with a respective bin. As such, when an ARN packet is received via a port, a determination as to which bin the ARN packet is associated may be made by reading the local bin information 121 such as may be stored in memory 118.

The ARN packet may be handled by an adaptive routing mechanism 115. At 706, in response to receiving the ARN packet, the adaptive routing mechanism 115 may determine which bin is associated with the ARN packet and update local bin information associated with the bin. In particular, the adaptive routing mechanism may change the port associated with the bin. For example, if the bin is currently associated with a first port, the adaptive routing mechanism may de-associate the bin with the first port and associate the bin with a second port.

In some implementations, updating local bin information associated with a bin may involve switching the port associated with the bin with a port associated with another bin. In some implementations, the port to be associated with a bin following an update of the local bin information 121 may be selected through a deterministic process or a non-deterministic process.

While the systems and methods described herein refer to the use of ARN packets, it should be appreciated that in some implementations methods of local adaptive routing, such as port grading mechanisms, may also or alternatively be used to change bin assignments to avoid problematic ports. For example, if one flow in the computing system does not support out-of-order packets or cannot be changed from a particular port, the port used for that flow may be avoided by other flows.

Upon receiving an ARN packet, the adaptive routing mechanism may be capable of handling the ARN packet received from the port and delivering the ARN packet to the same bin from which the packet having caused the ARN packet was sent.

At 709, after the local bin information 121 is updated to reflect the new association of the bin with a different port, data assigned to the bin may be routed from the bin via the port newly associated with the bin.

The present disclosure encompasses methods with fewer than all of the steps identified in FIGS. 6 and 7 (and the corresponding description of the methods), as well as methods that include additional steps beyond those identified in FIGS. 6 and 7 (and the corresponding description of the methods). The present disclosure also encompasses methods that comprise one or more steps from the methods described herein, and one or more steps from any other method described herein.

Embodiments of the present disclosure include a method of routing packets, the method comprising: receiving a packet associated with a destination; determining a plurality of bins based on the destination of the packet, wherein each bin of the plurality of bins is associated with a respective port of a plurality of ports; selecting a bin of the plurality of bins for forwarding the packet; and forwarding the packet via the port associated with the selected bin.

Embodiments also include a switch, comprising one or more circuits to: receive a packet associated with a destination; determine a plurality of bins based on the destination of the packet, wherein each bin of the plurality of bins is associated with a respective port of a plurality of ports; select a bin of the plurality of bins for forwarding the packet; and forward the packet via the port associated with the selected bin.

Embodiments also include a network device comprising: a plurality of ports; and one or more circuits to: receive a plurality of packets associated with a destination; determine a plurality of bins based on the destination of the packets, wherein each bin of the plurality of bins is associated with a respective port of the plurality of ports; and for each packet of the plurality of packets: select a bin of the plurality of bins; and forward the packet via the port associated with the selected bin.

Aspects of the above method, switch, and network device include receiving an adaptive routing notification (ARN) packet via a first port of the plurality of ports, wherein the first port of the plurality of ports is associated with a first bin; and in response to receiving the ARN packet, associating the first bin with a second port and de-associating the first bin with the first port.

Aspects of the above method, switch, and network device also include wherein the selected bin is selected using a non-deterministic process.

Aspects of the above method, switch, and network device also include wherein the non-deterministic process is random or pseudo-random.

Aspects of the above method, switch, and network device also include wherein the selected bin is selected using a round-robin selection process.

Aspects of the above method, switch, and network device also include receiving a second packet associated with the destination; selecting a second bin of the plurality of bins for forwarding the second packet, wherein the second bin is different from the first bin; and forwarding the second packet via the respective port associated with the second bin.

Aspects of the above method, switch, and network device also include wherein each bin of the plurality of bins is further associated with a destination address.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of routing packets, the method comprising:
receiving a plurality of packets associated with a destination, wherein the destination is associated with a subset of a network;
identifying a subset of bins from among a plurality of bins based on the destination of the plurality of packets, wherein each bin of the plurality of bins is associated with a respective port of a plurality of ports and is associated with one or more destinations, wherein identifying the subset of bins comprises determining the respective port associated with each bin of the subset of bins is associated with the subset of the network, and wherein one or more bins of the plurality of bins is not included in the subset of bins; and
spreading the plurality of packets across one or more of the plurality of ports by, for each respective packet of the plurality of packets,
executing a selection process to select a respective bin of the subset of bins for forwarding the respective packet,
based on the selection process, identifying the respective port associated with the respective selected bin of the subset of bins, and forwarding the respective packet via the respective port associated with the respective selected bin of the subset of bins.

2. The method of claim 1, further comprising:
receiving an adaptive routing notification (ARN) packet via a first port of the plurality of ports, wherein the first port of the plurality of ports is associated with a first bin of the plurality of bins, and wherein the first port of the plurality of ports is associated with the subset of the network; and
in response to receiving the ARN packet, associating the first bin of the plurality of bins with a second port of the plurality of ports, wherein the second port of the plurality of ports is associated with the subset of the network and de-associating the first bin of the plurality of bins with the first port of the plurality of ports.

3. The method of claim 1, wherein the selection process is a non-deterministic process.

4. The method of claim 1, wherein the selection process is random or pseudo-random.

5. The method of claim 1, wherein the selection process is a round-robin selection process.

6. The method of claim 1, wherein each bin of the plurality of bins is further associated with a destination address.

7. A switch, comprising one or more circuits to:
receive a plurality of packets associated with a destination, wherein the destination is associated with a subset of a network;
identify a subset of bins from among a plurality of bins based on the destination of the plurality of packets, wherein each bin of the plurality of bins is associated with a respective port of a plurality of ports and is associated with one or more destinations, wherein identifying the subset of bins comprises determining the respective port associated with each bin of the subset of bins is associated with the subset of the network, and wherein one or more bins of the plurality of bins is not included in the subset of bins; and
spreading the plurality of packets across one or more of the plurality of ports by, for each respective packet of the plurality of packets,
executing a selection process to select a respective bin of the subset of bins for forwarding the respective packet,
based on the selection process, identifying the respective port associated with the respective selected bin of the subset of bins, and
forwarding the respective packet via the respective port associated with the respective selected bin of the subset of bins.

8. The switch of claim 7, wherein the one or more circuits are further to:
receive an adaptive routing notification (ARN) packet via a first port of the plurality of ports, wherein the first port of the plurality of ports is associated with a first bin of the plurality of bins, and wherein the first port of the plurality of ports is associated with the subset of the network; and
in response to receiving the ARN packet, associate the first bin of the plurality of bins with a second port of the plurality of ports, wherein the second port of the plurality of ports is associated with the subset of the network and de-associate the first bin of the plurality of bins with the first port of the plurality of ports.

9. The switch of claim 7, wherein the selection process is a non-deterministic process.

10. The switch of claim 7, wherein the selection process is random or pseudo-random.

11. The switch of claim 7, wherein the selection process is a round-robin selection process.

12. The switch of claim 7, wherein each bin of the plurality of bins is further associated with a destination address.

13. A network device comprising:
a plurality of ports; and
one or more circuits to:
receive a plurality of packets associated with a destination, wherein the destination is associated with a subset of a network;
identify a subset of bins from among a plurality of bins based on the destination of the plurality of packets, wherein each bin of the plurality of bins is associated with a respective port of the plurality of ports and is associated with one or more destinations, wherein identifying the subset of bins comprises determining the respective port associated with each bin of the subset of bins is associated with the subset of the network, and wherein one or more bins of the plurality of bins is not included in the subset of bins; and
spread the plurality of packets across one or more of the plurality of ports by, for each respective packet of the plurality of packets,
executing a selection process to select a respective bin of the subset of bins for forwarding the respective packet,
based on the selection process, identifying the respective port associated with the respective selected bin of the subset of bins, and
forward the respective packet via the respective port associated with the respective selected bin of the subset of bins.

14. The network device of claim 13, wherein the one or more circuits are further to:
receive an adaptive routing notification (ARN) packet via a first port of the plurality of ports, wherein the first port of the plurality of ports is associated with a first bin of the plurality of bins, and wherein the first port of the plurality of ports is associated with the subset of the network; and
in response to receiving the ARN packet, associate the first bin of the plurality of bins with a second port of the plurality of ports, wherein the second port of the plurality of ports is associated with the subset of the network and de-associate the first bin of the plurality of bins with the first port of the plurality of ports.

15. The network device of claim 13, wherein the selection process is a non-deterministic process.

16. The network device of claim 13, wherein the selection process is random or pseudo-random.

17. The network device of claim 13, wherein each bin of the plurality of bins is further associated with a destination address.

18. The network device of claim 13, wherein the selection process is a round-robin selection process.

19. The method of claim 1, wherein a first bin of the plurality of bins is associated with a first port of the plurality of ports and the method further comprises de-associating the first bin of the plurality of bins with the first port of the plurality of ports and associating the first bin of the plurality of bins with a second port of the plurality of ports in response to an adaptive routing notification (ARN) packet.

20. The method of claim 19, wherein the ARN packet is received via the first port of the plurality of ports and the method further comprises associating the first port of the plurality of ports with a second bin of the plurality of bins in further response to the ARN packet.

\* \* \* \* \*